United States Patent Office 3,262,974
Patented July 26, 1966

3,262,974
PROCESS FOR THE PREPARATION OF CARBAMYL CHLORIDE
Johannes J. Steggerda, Geleen, Netherlands, assignor to Stamicarbon N.V., Heerlen, Netherlands
No Drawing. Filed Jan. 28, 1963, Ser. No. 254,471
Claims priority, application Netherlands, Jan. 31, 1962, 274,226
7 Claims. (Cl. 260—544)

The present invention relates to a process for preparing carbamyl chloride ($H_2NCOCl$) from urea or biuret and hydrochloric acid gas.

Carbamyl chloride is a liquid of high chemical reactivity at room temperature. This makes the compound a suitable starting product for several organic syntheses. Typical examples of organic syntheses using carbamyl chloride are the preparation of urethanes and Friedel-Crafts syntheses.

It is known that carbamyl chloride can be prepared from phosgene and ammonia at a temperature of about 450° C. However, such a process is not attractive because of the toxicity of phosgene. The chloride can also be prepared on a laboratory scale by passing dry hydrochloric acid gas over heated cyanuric acid, the cyanuric acid depolymerizing to isocyanic acid, which is then converted to carbamyl chloride according to the reaction $$HNCO + HCl \rightarrow H_2NCOCl$$

This process is not particularly suitable for industrial application because the cyanuric acid is not produced in large amounts.

It is also known that urea or biuret splits up into ammonia and isocyanic acid during intense heating.

According to the present invention, carbamyl chloride is prepared by a process which involves the formation of isocyanic acid from urea and/or biuret, and the conversion of this acid to carbamyl chloride by means of hydrochloric acid gas. This is accomplished by feeding urea and/or biuret into a fluidized bed kept at a temperature of 300 to 500° C. and consisting of particles which are resistant or inert to the substances added, keeping the bed in the fluidized state by means of a carrier current of dry hydrochloric acid gas, discharging the resulting gas mixture from the bed and subjecting this gas mixture to fractional condensation by first cooling it until solid ammonium chloride precipitates and subsequently cooling the remaining gas to such a degree that liquid carbamyl chloride condenses.

For reasons of economy, the inert particles constituting the fluidized bed preferably comprise sand. The size of the sand particles depends on the amount of carrier gas and, consequently, may vary within wide limits. However, as a general rule, particles varying in size from 0.05 mm. and 0.5 mm. are very suitable. In addition to sand, or in lieu thereof, oxidic substances may be used as silica gel, aluminum oxide and zirconium oxide. Coke particles may also be used in the fluidized bed.

The amount of carrier gas will usually be in the neighborhood of 100 to 250 liters of hydrochloric acid gas per 100 grams of urea and/or biuret and the amount of said nitrogen compounds fed to the bed of inert particles will usually be an hourly feed of from 500 to 1000 grams per 1000 grams inert particles. Contact times will vary but generally speaking the reaction is completed in less than one minute.

Precipitation of ammonium chloride in the solid state requires cooling the gas discharged from the fluidized bed to 200–275° C. at normal pressure. This separating step may also be carried out at superatmospheric pressure, but this offers no special advantages.

To condense liquid carbamyl chloride, the gas feed of ammonium chloride should be cooled to at least 60° C. at normal pressure. For a more rapid and complete condensation, however, the temperature is preferably lowered to 0–20° C.

The carbamyl chloride may also be condensed with the aid of a suitable organic solvent, for instance benzene or chloroform. Thus, for example, the gas containing carbamyl chloride may be introduced into an absorption column wetted with the organic solvent, and the resulting solution of carbamyl chloride in organic solvent is discharged from the base of this column.

The invention is illustrated but not limited by the following example:

125 liters of dry hydrochloric acid gas, serving as carrier gas for the bed, and 100 g. of urea were fed per hour into a fluid bed of sand grains of 0.1 mm. dia. The temperature of the bed, which was 4 cm. in section and 5 cm. in height, was kept at 350° C. The gases discharged from the bed were first introduced into a collecting reservoir where they were cooled to a temperature of 250° C. As a result of this cooling operation, solid ammonium chloride separated off, the solid being left in the reservoir. The gas mixture discharged from the reservoir was then passed through a water-cooled cooling spiral, causing condensation of the carbamyl chloride which was collected in a reservoir positioned under the cooling spiral. The yield amounted to about 100 g. of carbamyl chloride per hour.

It will be appreciated that various modifications may be made in the invention described above without deviating from the scope thereof as set forth in the following claims wherein I claim:

1. In a process for preparing carbamyl chloride by reacting hydrochloric acid with a nitrogen compound selected from the group consisting of urea and biuret, the improvement comprising maintaining a bed of heat-resistant, inert particles in the fluidized state by means of dry hydrochloric acid gas, feeding particles of said nitrogen compound directly into said fluidized bed while said bed is at a temperature of 300° to 500° C., removing the resulting gas mixture from said bed and subjecting said mixture to fractional condensation by first cooling the mixture until solid ammonium chloride precipitates and subsequently cooling the remaining gas sufficiently to condense liquid carbamyl chloride.

2. The process of claim 1 wherein said inert particles are sand.

3. The process of claim 1 wherein said fractional condensation is carried out at atmospheric pressure.

4. The process of claim 1 wherein said inert particles vary in size from 0.05 mm. to 0.5 mm.

5. The process of claim 1 wherein said gas mixture is first cooled to 200–275° C. to separate out said ammonium chloride and then is cooled to 0–20° C. to condense said carbamyl chloride.

6. The process of claim 1 wherein said carbamyl chloride is condensed by direct contact with an inert organic solvent.

7. The process of claim 1 wherein from 100 to 250 liters of hydrochloric acid gas are used per 100 grams of said nitrogen compound.

References Cited by the Examiner

UNITED STATES PATENTS

| | | | |
|---|---|---|---|
| 1,937,328 | 11/1933 | Theis | 260—544 |
| 2,447,372 | 8/1948 | Slocombe et al. | 260—544 |
| 2,773,086 | 12/1956 | Slocombe et al. | 260—544 |

LORRAINE A. WEINBERGER, *Primary Examiner.*

LEON ZITVER, *Examiner.*

R. K. JACKSON, *Assistant Examiner.*